US011482010B2

(12) United States Patent
Murad et al.

(10) Patent No.: US 11,482,010 B2
(45) Date of Patent: Oct. 25, 2022

(54) METHODS AND SYSTEMS TO UTILIZE CAMERAS TO PREDICT DRIVER INTENTION AND HIGHLIGHT USEFUL DATA

(71) Applicant: GM GLOBAL TECHNOLOGY OPERATIONS LLC, Detroit, MI (US)

(72) Inventors: Mohannad Murad, Troy, MI (US); Alexander Sherman, Petah Tiqwa (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/105,155

(22) Filed: Nov. 25, 2020

(65) Prior Publication Data

US 2022/0164583 A1 May 26, 2022

(51) Int. Cl.
| | |
|---|---|
| *G06V 20/56* | (2022.01) |
| *H04N 5/247* | (2006.01) |
| *G06F 3/14* | (2006.01) |
| *G01S 19/48* | (2010.01) |
| *G06Q 30/02* | (2012.01) |
| *G06F 16/24* | (2019.01) |
| *B60R 11/04* | (2006.01) |
| *B60R 1/00* | (2022.01) |
| *G06T 7/70* | (2017.01) |
| *B60R 11/00* | (2006.01) |

(52) U.S. Cl.
CPC ............... *G06V 20/56* (2022.01); *B60R 1/00* (2013.01); *B60R 11/04* (2013.01); *G01S 19/485* (2020.05); *G06F 3/14* (2013.01); *G06F 16/24* (2019.01); *G06Q 30/0205* (2013.01); *G06Q 30/0266* (2013.01); *G06T 7/70* (2017.01); *H04N 5/247* (2013.01); *B60R 2011/0003* (2013.01); *B60R 2011/004* (2013.01); *B60R 2300/105* (2013.01); *B60R 2300/8006* (2013.01); *G06T 2207/30201* (2013.01); *G06T 2207/30268* (2013.01)

(58) Field of Classification Search
None
See application file for complete search history.

(56) References Cited

U.S. PATENT DOCUMENTS

| | | | |
|---|---|---|---|
| 2017/0187963 A1* | 6/2017 | Lee | G06V 20/597 |
| 2018/0229654 A1* | 8/2018 | Unver | G06V 20/597 |
| 2019/0265712 A1* | 8/2019 | Satzoda | B60W 40/09 |
| 2020/0318989 A1* | 10/2020 | Yang | G01C 21/3667 |
| 2021/0064030 A1* | 3/2021 | Jiang | G08G 1/096877 |

* cited by examiner

*Primary Examiner* — Lindsay J Uhl
(74) *Attorney, Agent, or Firm* — Lorenz & Kopf LLP

(57) ABSTRACT

In an exemplary embodiment, a vehicle is provided that includes an internal camera, one or more external systems, a display system, and a processor. The internal camera is configured to obtain internal camera data pertaining a gaze of a driver inside a vehicle. The one or more external systems are configured to obtain external data as to a region of interest outside the vehicle corresponding to the gaze of the driver. The processor is coupled to the internal camera and the one or more external systems, and is configured to at least facilitate providing feedback pertaining to the region of interest to a driver of the vehicle via the display system based on the internal camera data and the external data.

18 Claims, 3 Drawing Sheets

METHODS AND SYSTEMS TO UTILIZE CAMERAS TO PREDICT DRIVER INTENTION AND HIGHLIGHT USEFUL DATA

TECHNICAL FIELD

The technical field generally relates to vehicles, and more particularly relates to methods and systems for utilizing cameras to predict driver intention and highlight useful data for drivers of vehicles.

Certain vehicles today have telematics units that provide information via a navigation system as to points of interest in proximity to the vehicle. However, such telematics units and navigation systems may not always provide optimal information in certain circumstances.

Accordingly, it may be desirable to provide improved methods and systems for providing information to drivers, for example as to nearby points of interest, based on driver intention. Furthermore, other desirable features and characteristics of the present invention will become apparent from the subsequent detailed description of the invention and the appended claims, taken in conjunction with the accompanying drawings and this background of the invention.

SUMMARY

In accordance with an exemplary embodiment, a method is provided that includes: obtaining internal camera data pertaining a gaze of a driver inside a vehicle from one or more internal cameras disposed inside the vehicle; obtaining external data as to a region of interest outside the vehicle corresponding to the gaze of the driver, via one or more systems configured to generate the external data pertaining to an environment outside the vehicle; and providing feedback, via a processor, pertaining to the region of interest, based on the internal camera data and the external data.

Also in an exemplary embodiment, the external data as to the region of interest outside the vehicle corresponding to the gaze of the driver is obtained via one or more external cameras facing outside the vehicle.

Also in an exemplary embodiment, the detection of external data as to the region of interest outside the vehicle is further enhanced via one or more satellite-based location systems in conjunction with map data.

Also in an exemplary embodiment, the method further includes: identifying a point of interest in proximity to the vehicle, based on the camera data and the additional data; and obtaining related information from a computer database pertaining to the point of interest; wherein the step of providing feedback includes providing, via instructions provided by the processor to a display of the vehicle, the related information pertaining to the point of interest to the driver of vehicle.

Also in an exemplary embodiment, the step of obtaining related information includes obtaining advertising or promotional information pertaining to the point of interest; and the step of providing feedback includes providing, via instructions provided by the processor to the display of the vehicle, the advertising or promotional information pertaining to the point of interest to the driver of vehicle.

Also in an exemplary embodiment, the step of providing feedback includes providing, via instructions provided by the processor to a visual display screen or a visual projection system of the vehicle, the relevant information pertaining to the point of interest to the driver of vehicle.

In another exemplary embodiment, a system is provided that includes an internal camera, one or more external systems, and a processor. The internal is camera configured to obtain internal camera data pertaining a gaze of a driver inside a vehicle. The one or more external systems are configured to obtain external data as to a region of interest outside the vehicle corresponding to the gaze of the driver. The processor is coupled to the internal camera and the one or more external systems, and is configured to at least facilitate providing feedback pertaining to the region of interest based on the internal camera data and the external data.

Also in an exemplary embodiment, the one or more external systems includes one or more external cameras facing outside the vehicle.

Also in an exemplary embodiment, the one or more external systems further includes one or more satellite-based location systems, and wherein the external data as to the region of interest outside the vehicle is further enhanced via the one or more satellite-based location systems in conjunction with map data.

Also in an exemplary embodiment, the processor is further configured to at least facilitate: identifying a point of interest in proximity to the vehicle, based on the camera data and the external data; obtaining relevant information from a computer database pertaining to the point of interest; and providing instructions to a display of the vehicle to provide the relevant information pertaining to the point of interest to the driver of vehicle.

Also in an exemplary embodiment, the processor is configured to at least facilitate: obtaining advertising or promotional information pertaining to the point of interest; and providing instructions to the display of the vehicle, the advertising or promotional information pertaining to the point of interest to the driver of vehicle.

Also in an exemplary embodiment, the processor is configured to at least facilitate providing instructions to a visual display screen of the vehicle, the relevant information pertaining to the point of interest to the driver of vehicle.

Also in an exemplary embodiment, the processor is configured to at least facilitate providing instructions to a visual projection system inside the vehicle, the relevant information pertaining to the point of interest to the driver of vehicle.

In a further exemplary embodiment, a vehicle is provided that includes an internal camera, one or more external systems, a display system, and a processor. The internal camera is configured to obtain internal camera data pertaining a gaze of a driver inside a vehicle. The one or more external systems are configured to obtain external data as to a region of interest outside the vehicle corresponding to the gaze of the driver. The processor is coupled to the internal camera and the one or more external systems, and is configured to at least facilitate providing feedback pertaining to the region of interest to a driver of the vehicle via the display system based on the internal camera data and the external data.

Also in an exemplary embodiment, the one or more external systems includes one or more external cameras facing outside the vehicle.

Also in an exemplary embodiment, the one or more external systems further includes one or more satellite-based location systems, and wherein the external data as to the region of interest outside the vehicle is further enhanced via the one or more satellite-based location systems in conjunction with map data.

Also in an exemplary embodiment, the processor is further configured to at least facilitate: identifying a point of interest in proximity to the vehicle, based on the camera data and the additional data; obtaining relevant information from a computer database pertaining to the point of interest; and providing instructions to the display system to provide the relevant information pertaining to the point of interest to the driver.

Also in an exemplary embodiment, the processor is configured to at least facilitate: obtaining advertising or promotional information pertaining to the point of interest; and providing instructions to the display of the vehicle, the advertising or promotional information pertaining to the point of interest to the driver of vehicle.

Also in an exemplary embodiment, the display system includes a visual display screen.

Also in an exemplary embodiment, the display system includes a visual projection system.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
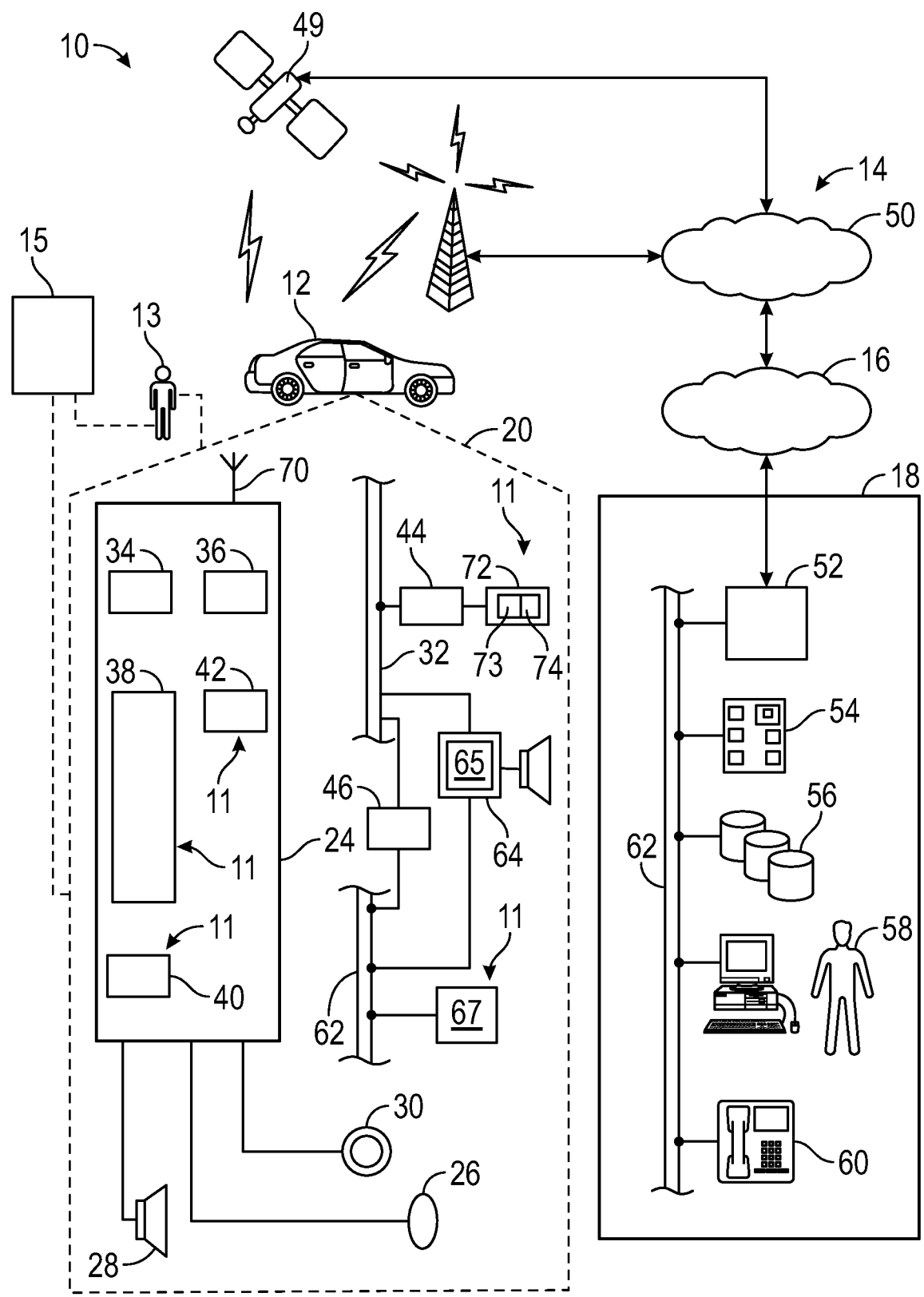
FIG. 1 is a functional block diagram of a communications system that includes a vehicle having a control system that is configured to ascertain driver intent and provide related information for a driver of the vehicle, in accordance with exemplary embodiments.

FIG. 1 is a functional block diagram of a communications system 10, in accordance with an exemplary embodiment. As described in greater detail further below, the communications system 10 includes a vehicle 12 that includes a control system 11 that is configured to ascertain driver intent and provide related information for a driver 13 of the vehicle 12. As described further below in connection with FIG. 1 as well as FIG. 2, in various embodiments, the control system 11 includes a processor 38, computer memory 40, a satellite-based location determining system component (e.g., GPS) 42, internal cameras 73, external cameras 74, and one or more displays 67.

As depicted in FIG. 1, in certain embodiments, the user 13 also has a device 15, such as a smart phone, computer, and/or other electronic device 15, for example that may communicate with both the user 13 and the vehicle 12.

As depicted in FIG. 1, the communications system 10 generally includes the vehicle 12, along with one or more wireless carrier systems 14, one or more land networks 16, and one or more remote servers 18. It should be appreciated that the overall architecture, setup and operation, as well as the individual components of the illustrated system are merely exemplary and that differently configured communications systems may also be utilized to implement the examples of the method disclosed herein. Thus, the following paragraphs, which provide a brief overview of the illustrated communications system 10, are not intended to be limiting.

The vehicle 12 may be any type of mobile vehicle such as a motorcycle, car, truck, recreational vehicle (RV), boat, plane, farm equipment, or the like, and is equipped with suitable hardware and software that enables it to communicate over communications system 10. As shown in FIG. 1, in various embodiments the vehicle hardware 20 is disposed within a body 19 of the vehicle 12, and includes a telematics unit 24, a microphone 26, a speaker 28, and buttons and/or controls 30 connected to the telematics unit 24. Operatively coupled to the telematics unit 24 is a network connection or vehicle bus 32. Examples of suitable network connections include a controller area network (CAN), a media-oriented system transfer (MOST), a local interconnection network (LIN), an Ethernet, and other appropriate connections such as those that conform with known ISO (International Organization for Standardization), SAE (Society of Automotive Engineers), and/or IEEE (Institute of Electrical and Electronics Engineers) standards and specifications, to name a few.

The telematics unit 24 is an onboard device that provides a variety of services through its communication with the remote server 18, and generally includes an electronic processing device (processor) 38, one or more types of electronic memory 40, a cellular chipset/component 34, a wireless modem 36, a dual mode antenna 70, and a navigation unit containing a GPS chipset/component 42. In one example, the wireless modem 36 includes a computer program and/or set of software routines adapted to be executed within electronic processing device 38.

In various embodiments, the telematics unit 24 can be an embedded/installed within the vehicle 12 at the time of manufacture, or may be an aftermarket unit that is installed after manufacture of the vehicle 12. In various embodiments, the telematics unit 24 enables voice and/or data communications over one or more wireless networks (e.g., wireless carrier system 14), and/or via wireless networking, thereby allowing communications with the remote server 18 and/or other vehicles and/or systems.

In various embodiments, the telematics unit 24 may use radio transmissions to establish a voice and/or data channel with the wireless carrier system 14 so that both voice and data transmissions can be sent and received over the voice and/or data channels. Vehicle communications are enabled via the cellular chipset/component 34 for voice communications and the wireless modem 36 for data transmission. Any suitable encoding or modulation technique may be used with the present examples, including digital transmission technologies, such as TDMA (time division multiple access), CDMA (code division multiple access), W-CDMA (wideband CDMA), FDMA (frequency division multiple access), OFDMA (orthogonal frequency division multiple access), and the like. In one embodiment, dual mode antenna 70 services the GPS chipset/component 42 and the cellular chipset/component 34. In various embodiments, the telematics unit 24 utilizes cellular communication according to industry standards, such as LTE, 5G, or the like. In addition, in various embodiments, the telematics unit 24 carries out wireless networking between the vehicle 12 and one or more other network devices, for example using one or more wireless protocols such as one or more IEEE 802.11 protocols, WiMAX, or Bluetooth.

The telematics unit 24 may offer a number of different services for users of the vehicle 12, including identifying an intent of the driver 13 looking at a nearby point of interest and providing information pertaining to the point of interest to the driver. In addition, in certain embodiments, the telematics unit 24 may also provide additional services such as, by way of example, the connection with electronic devices 15. In various embodiments, the electronic devices may include, by way of example, various consumer electronic/mobile devices, such as a smart phone, a laptop, a smart wearable device, a tablet computer, a network computer, and/or one or more other electronic devices and/or combinations thereof.

In various embodiments, one or more short-range wireless connection (SRWC) protocols (e.g., Bluetooth/Bluetooth Low Energy, or Wi-Fi) may be utilized. In various embodiments, once the SRWC is established, the electronic devices 15 may be become bonded and/or recognized as network participants for the telematics unit 24, for example for current uses as well as in the future. For example, in certain embodiments, when the electronic device 15 is subsequently in wireless range with the telematics unit 24 after the initial pairing, telematics unit 24 (and/or the remote server 18) may confirm that the electronic device 15 is recognized as already being paired or established as a network participant for communicating with the telematics unit 24 and receiving services therefrom.

In addition, in various embodiments, the telematics unit 24 may also provide other services, such as, by way of example: turn-by-turn directions and other navigation-related services provided in conjunction with the GPS chipset/component 42; emergency assistance services, information requests from the users of the vehicle 12 (e.g., regarding points of interest en route while the vehicle 12 is travelling), and/or infotainment-related services, for example in which music, internet web pages, movies, television programs, videogames, and/or other content are downloaded by an infotainment center 46 that may be part of the telematics unit 24 and/or operatively connected to the telematics unit 24 via vehicle bus 32 and audio bus 22, among various other types of possible services.

With respect to other electronic components utilized in connection with the telematics unit 24, the microphone 26 provides the driver or other vehicle occupant with a means for inputting verbal or other auditory commands, and can be equipped with an embedded voice processing unit utilizing a human/machine interface (HMI) technology known in the art. Conversely, speaker 28 provides audible output to the vehicle occupants and can be either a stand-alone speaker specifically dedicated for use with the telematics unit 24 or can be part of a vehicle audio component 64. In either event, microphone 26 and speaker 28 enable vehicle hardware 20 and remote server 18 to communicate with the occupants through audible speech. The vehicle hardware also includes one or more buttons and/or controls 30 for enabling a vehicle occupant to activate or engage one or more of the vehicle hardware components 20. For example, one of the buttons and/or controls 30 can be an electronic pushbutton used to initiate voice communication with remote server 18 (whether it be a human such as advisor 58 or an automated call response system). In another example, one of the buttons and/or controls 30 can be used to initiate emergency services.

The audio component 64 is operatively connected to the vehicle bus 32 and the audio bus 22. The audio component 64 receives analog information, rendering it as sound, via the audio bus 22. Digital information is received via the vehicle bus 32. The audio component 64 provides amplitude modulated (AM) and frequency modulated (FM) radio, compact disc (CD), digital video disc (DVD), and multimedia functionality independent of the infotainment center 46. Audio component 64 may contain a speaker system, or may utilize speaker 28 via arbitration on vehicle bus 32 and/or audio bus 22. In various embodiments, the audio component 64 includes radio system 65 (which also includes antenna 70, as well as amplifiers, speakers, and the like, in certain embodiments).

Also in various embodiments, display component 67 provides a visual display for the driver 13 of the vehicle 12. In various embodiments, the display components 67 provides a visual display for the driver 13 as to relevant information pertaining to a point of interest that the driver 13 is currently looking at, for example as described in greater detail further below in connection with FIGS. 2 and 3. For example, in certain embodiments, the display component 67 may comprise one or more visual display systems such as a visual display screen for a navigation system of the vehicle, a head up display (HUD) and/or other visual display and/or visual projection, such as on a windshield of the vehicle 12, and so on. In certain embodiments, such information may also be provided via an audio system, such as the audio component 64.

Vehicle sensors 72, connected to various sensor interface modules 44 are operatively connected to the vehicle bus 32.

In various embodiments, the vehicle sensors 72 include both internal cameras 73 and external cameras 74. In various embodiments, one or more internal cameras 73 (e.g., mounted on a vehicle ceiling, mirror, dash, and/or other location in proximity to the driver 13) measure and monitor eye location and movement of the driver 13, for generating a vector indicating a direction in which the driver 13 is looking, from inside the vehicle 12.

Also in various embodiments, the external cameras 74 are mounted at various locations outside the vehicle 12, in order to ascertain where outside the vehicle 12 the driver 13 is looking, such as a nearby point of interest. In certain embodiments, at least four external cameras 74 are positioned around the vehicle 12, so as to provide a three hundred sixty degree view outside and around the vehicle 12.

In addition, in various embodiments, the vehicle sensors 72 may also include any number of additional sensors including, by way of example, gyroscopes, accelerometers, magnetometers, emission detection, and/or control sensors, and the like. Also in various embodiments, exemplary sensor interface modules 44 include powertrain control, climate control, and body control, to name but a few.

In various embodiments, the wireless carrier systems 14 may be any number of cellular telephone systems, satellite-based wireless systems, and/or any other suitable wireless systems, for example that transmits signals between the vehicle hardware 20 and land network 16 (and/or, in certain embodiments, that communicate directly with the vehicle 12 and/or the remote server 18). According to certain examples, wireless carrier system 14 may include and/or be coupled to one or more cell towers 48, satellites 49, base stations and/or mobile switching centers (MSCs) 50, as well as any other networking components required to connect the wireless carrier system 14 with land network 16. As appreciated by those skilled in the art, various cell tower/base station/MSC arrangements are possible and could be used with wireless carrier system 14.

The land network 16 can be a conventional land-based telecommunications network that is connected to one or more landline telephones, and that connects wireless carrier system 14 to remote server 18. For example, the land network 16 can include a public switched telephone network (PSTN) and/or an Internet protocol (IP) network, as is appreciated by those skilled in the art. Of course, one or more segments of the land network 16 can be implemented in the form of a standard wired network, a fiber or other optical network, a cable network, other wireless networks such as wireless local networks (WLANs) or networks providing broadband wireless access (BWA), or any combination thereof.

The remote server 18 is designed to provide the vehicle hardware 20 with a number of different system back-end functions and, according to the example shown here, generally includes one or more switches 52, servers 54, databases 56, advisors 58, as well as a variety of other telecommunication/computer equipment 60. These various call center components are suitably coupled to one another via a network connection or bus 62, such as the one previously described in connection with the vehicle hardware 20. Switch 52, which can be a private branch exchange (PBX) switch, routes incoming signals so that voice transmissions are usually sent to either advisor 58 or an automated response system, and data transmissions are passed on to a modem or other piece of telecommunication/computer equipment 60 for demodulation and further signal processing.

The modem or other telecommunication/computer equipment 60 may include an encoder, as previously explained, and can be connected to various devices such as a server 54 and database 56. For example, database 56 could be designed to store subscriber profile records, subscriber behavioral patterns, or any other pertinent subscriber information. Although the illustrated example has been described as it would be used in conjunction with a remote server 18 that is manned, it will be appreciated that the remote server 18 can be any central or remote facility, manned or unmanned, mobile or fixed.

Figure 2:
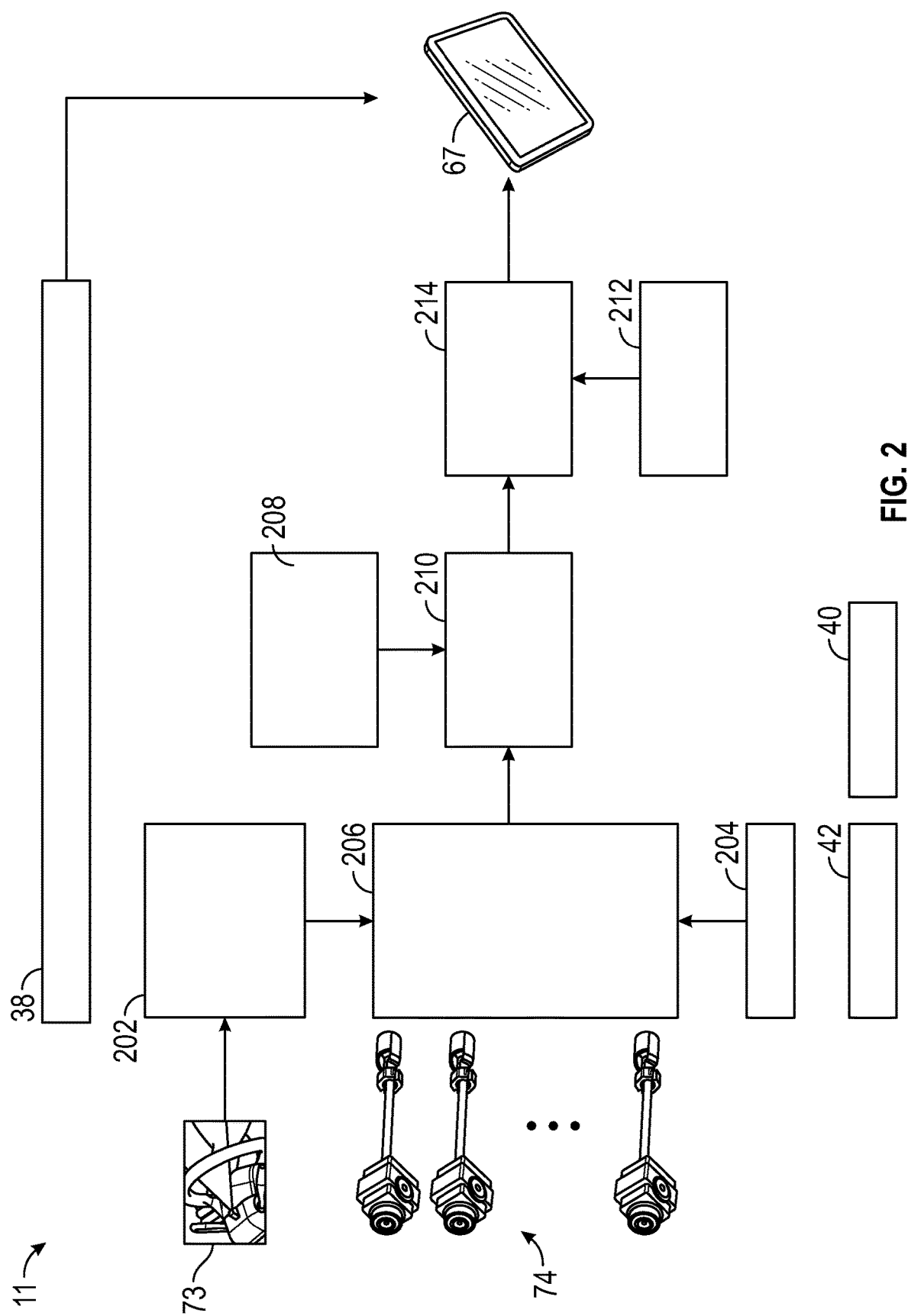
FIG. 2 is a flow diagram depicting functionality of the control system of FIG. 1, in accordance with exemplary embodiments.

FIG. 2 is a flow diagram depicting functionality of the control system 11 of FIG. 1, in accordance with exemplary embodiments. As depicted in FIG. 2, and similar to the discussion above, in various embodiments the control 11 system includes the processor 38, computer memory 40, location (e.g., GPS) component 42, internal cameras 73, external cameras 74, and display system 75 of FIG. 1.

Also as depicted in FIG. 2, in various embodiments, the internal cameras 73 provide data (e.g., images and/or vector coordinates) of the driver 13's eyes from inside the vehicle 12, which are used by the processor 38 to determine a gaze vector indicating where the driver 13 is looking from inside the vehicle 12 (e.g., utilizing an algorithm 202 to detect where the driver 13 is looking).

Also in various embodiments, the processor 38 utilizes the gaze vector, along with map data/location (e.g., GPS) data 204 obtained from the memory 40 and/or GPS system 42, in order to identify a point of interest at which the driver 13 is looking (e.g., using an algorithm 204 to identify the point of interest at the scene in proximity to the vehicle 12). In addition, in various embodiments, the processor also obtains point of interest data 208 (e.g., marketing and/or advertising data pertaining to nearby points of interest), and filters the point of interest data with respect to the identified point of interest at which the driver 13 is looking (e.g., using an algorithm 210 to filter the data based on the identified point of interest).

In addition, in various embodiments, the processor 38 also provides the filtered data 214 for the driver 13 on a display system 67 of the vehicle 12 (e.g. as part of a visual display screen and/or projection on a windshield of the vehicle 12 via a visual projection system, and so on). In certain embodiments, the display is also provided in combination with additional video 212 provided from one or more other vehicle systems, such as by way of example an augmented reality video for the vehicle 12.

Figure 3:
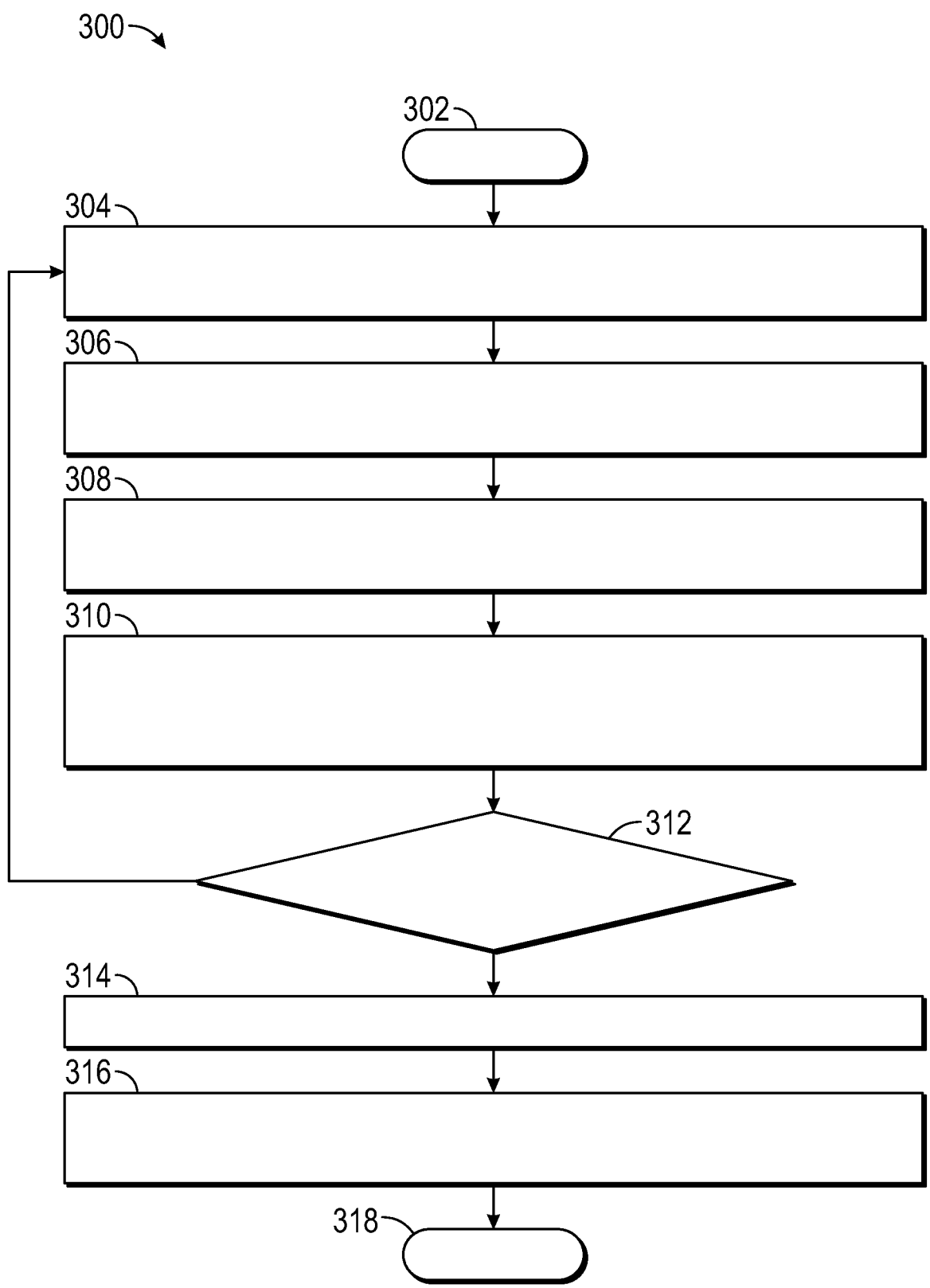
FIG. 3 is a flowchart of a process for ascertaining driver intent and providing related information for a driver of a vehicle, and that can be used in connection with the communications system of FIG. 1, including the vehicle thereof, the control system of FIGS. 1 and 2, and other components thereof, in accordance with exemplary embodiment.

FIG. 3 is a flowchart of a process 300 for ascertaining driver intent and provided related information for a driver of a vehicle, in accordance with exemplary embodiments. In various embodiments, the process 300 can be used in connection with the communications system 10 of FIG. 1, including the vehicle 12 thereof, the control system 11 of FIGS. 1 and 2, and other components thereof.

As depicted in FIG. 3, in various embodiments the process 300 begins at step 302. In certain embodiments, the process 300 begins when one or more users of the vehicle 12 (e.g., a driver) approaches or enters the vehicle 12, or turns on the vehicle 12 and/or an ignition therefor (e.g. by turning a key, engaging a keyfob or start button, and so on), and/or when a vehicle drive begins or is initiated. In certain embodiments, the steps of the process 300 are performed continuously during operation of the vehicle 12.

During step 304, a driver's eyes are monitored. In various embodiments, one or more internal cameras 73 of FIG. 1 (inside a cabin of the vehicle 12) monitor a gaze of one or both eyes of the driver 13, including a direction of the gaze, via internal camera data obtained by the internal cameras 73 as to the driver 13's eyes, and the position and/or movement thereof.

During step 306, the gaze of the driver is analyzed. Specifically, in various embodiments, the processor 38 of FIG. 1 utilizes the internal camera data of step 304 from the internal cameras 73 in order to generate an eye gaze vector for the driver 13, using one or more extrinsic and intrinsic parameters. In various embodiments, examples of intrinsic parameters may include camera position (x,y,z) and camera orientation (pitch, roll, yaw), among other possible parameters. Also in various embodiments, examples of intrinsic parameters may include camera lens distortion coefficients and camera focal point, among other possible parameters.

During step 308, one or more external devices are used for interpreting the gaze vector of step 306. In certain embodiments, one or more external cameras 74 of the vehicle 12 are selected by the processor 38 based on the gaze vector, for example to include external cameras 74 that are in proximity to the gaze vector, based on external data as to an outside environment surrounding the vehicle 12 as generated by one or more external systems. In addition, in various embodiments, the processor 38 also translates the vector into camera coordinates and maps the vector to certain objects or points within the external camera 74 field of view in order to further ascertain what the driver is specifically looking at.

Furthermore, in certain other embodiments, a satellite-based location system (such as GPS system 42) is utilized, for example in conjunction with map data stored in computer memory 40, for location data that corresponds to the gaze vector. In various embodiments, the external cameras 74 and the satellite-based location system (e.g., GPS system 42) are utilized in combination together to interpret the eye gaze vector, and specifically to help identify locations, including points of interest, in proximity to the vehicle that are consistent with the eye gaze vector.

In various embodiments, the gaze vector is translated into a region of interest during step 310. Specifically, in various embodiments, the processor 38 translates the gaze vector, using intrinsic and extrinsic parameters, in world coordinates into a region of interest. In certain embodiments, the processor 38 translates the gaze vector in world coordinates into a region of interest surrounding the vehicle 12 in one or more two dimensional images of the identified exterior camera(s) of step 308. In certain other embodiments, the processor 38 translates the gaze vector in world coordinates into a point of interest surrounding the vehicle 12 that maps to the identified satellite-based location system (e.g., GPS system 42) of step 308.

Accordingly, in various embodiments, the external camera, and the perception from the external camera, is utilized to identify what the drier is looking at. In certain embodiments, the identification may be further enhanced using GPS/map data. In addition, in certain embodiments, the identification may also be further enhanced by also incorporating an audio functionality. For example, in certain embodiments, a driver may say something to a human and/or automated advisor, and this may be used in combination with the internal camera data and external camera data to further enhance the identification of the point of interest at which the driver is looking, for example as described in greater detail further below.

Also in various embodiments, a determination is made in step 312 as to whether any points of interest are disposed in the region of interest of step 310. In certain embodiments, the processor 38 of FIG. 1 determines whether any points of interest are disposed in the region of interest at which the driver 13 of FIG. 1 would be looking, based on a mapping or correspondence between the gaze vector of step 306 with the external camera and/or GPS data of steps 308, 310. In various embodiments, a "point of interest" may refer to a restaurant, convenience store, grocery store, other type of store, gas station, service station, lodging establishment, tourist attraction, and/or any one of a number of other different types of points of interest.

In certain embodiments, during step 312, an external camera image is used to identify the point of interest. In addition, in certain embodiments, external camera data may be utilized in combination with GPS and map data to further enhance the identification of the point of interest. Also in certain embodiments, driver inputs may also be utilized in identifying the point of interest, for example if the driver has inputted a particular point of interest and/or type of point of interest for a navigation system and/or personal and/or virtual assistant and/or advisor (e.g., advisor 58 of FIG. 1, and/or an advisor accessed via electronic device 15 of FIG. 1), or the like. For example, as noted above, in certain embodiments, a driver may say something to a human and/or automated advisor, and this may be used in combination with the internal camera data and external camera data to further enhance the identification of the point of interest at which the driver is looking. For example, in one embodiment, the driver may state "I am hungry" to an advisor, and the external camera may extract features from a nearby fast food restaurant (or other food establishment) and then enhance such features with GPS/map data and provide further enhancements with marketing information related to that restaurant in the form of projection on windshield or augmented reality text on a video screen, and/or other or more other types of displays for the driver within the vehicle.

In various embodiments, if it is determined in step 312 that no corresponding point of interest is identified, then the process returns to step 304, described above.

Conversely, if it is instead determined in step 312 that a corresponding point of interest is identified, then the process proceeds instead to step 314, described below.

During step 314, data and information (collectively referred to herein as relevant information, or information pertaining to the point of interest) is retrieved regarding the point of interest identified in step 312. Specifically, in various embodiments, the processor 38 of FIG. 1 retrieves data from the memory 40 pertaining to the point of interest. For example, the data may pertain to hours of operation, pricing, sales, menus and/or other information pertaining to the point of interest. For example, if the point of interest is a restaurant and/or fast food establishment, the information may pertain to any sales of menu food and/or beverage items, or the like. In various embodiments, the data/information may be obtained directly from the point of interest and/or indirectly via one or more third parties and/or intermediaries.

In addition, in various embodiments, the relevant information pertaining to the point of interest is provided for the driver of the vehicle at step 316. In various embodiments, the processor 38 of FIG. 1 provides instructions to the display system 67 of FIG. 1 for displaying and/or projecting relevant advertising information and/or other data pertaining to the point of interest for the driver 13 of FIG. 1. For example, in certain embodiments, the data/information is provided for the driver 13 via a visual display screen for a navigation system of the vehicle, a head up display (HUD) and/or other visual display, such as on a windshield of the vehicle 12, and so on. In certain other embodiments, the relevant information may also be provided via an audio system, such as the audio component 64 of the vehicle 12.

Accordingly, in various embodiments, during step 316 relevant information is provided to the driver 13 based on a particular point of interest at which a gaze of the driver 13 is directed, as ascertained based on both internal cameras 73 (inside the vehicle 12, detecting the driver 13's gaze and a vector representative thereof) and external cameras 74 and satellite-based location systems such as a GPS system (outside the vehicle 12, confirming the real world coordinates and identifying the particular point of interest that corresponds to the gaze vector for the driver 13). In certain embodiments, advertisement and/or promotion information are provided to the driver 13 only on a further condition the driver 13 has previously agreed to receive such advertisements.

In various embodiments, the process then terminates at step 318. In certain embodiments, the process may resume at steps 302 and/or 304 when travel of the vehicle 12 has resumed past the point of interest.

Accordingly, methods and system are provided for ascertaining driver intent and provided related information for a driver of a vehicle, in accordance with exemplary embodiments. In various embodiments, one or more internal cameras of the vehicle measure data with respect to one or more eyes of the driver as to a direction in which the driver is looking. Also in various embodiments, a processor (and/or the internal cameras) generate a vector that includes the direction in which the driver is looking from inside the vehicle. In addition, in various embodiments, external cameras and satellite-based location systems (e.g., a GPS system) capture data as to a point of interest at which the driver is looking, based on the vector and data as to the point of interest. In addition, in various embodiments, the processor obtains and filters relevant data as to the point of interest at which the driver is looking, and provides instructions to display and/or project the information for the driver of the vehicle.

It will be appreciated that the systems and methods may vary from those depicted in the Figures and described herein. For example, the communications system of FIG. 1, including the vehicle thereof and components thereof, may vary from that depicted in FIG. 1 and/or described herein, in various embodiments. It will similarly be appreciated that the control system of FIGS. 1 and 2, and/or various components thereof and/or functionality thereof, may vary from the depictions in FIGS. 1 and 2 and the accompanying descriptions. It will also be appreciated that the process (and/or subprocesses) disclosed herein may differ from those described herein and/or depicted in FIG. 3, and/or that steps thereof may be performed simultaneously and/or in a different order as described herein and/or depicted in FIG. 3, among other possible variations.

While at least one example has been presented in the foregoing detailed description, it should be appreciated that a vast number of variations exist. It should also be appreciated that the example or examples are only examples, and are not intended to limit the scope, applicability, or configuration of the disclosure in any way. Rather, the foregoing detailed description will provide those skilled in the art with a convenient road map for implementing the example or examples. It should be understood that various changes can be made in the function and arrangement of elements without departing from the scope of the appended claims and the legal equivalents thereof.

What is claimed is:

1. A method comprising:
   obtaining internal camera data pertaining a gaze of a driver inside a vehicle from one or more internal cameras disposed inside the vehicle, the internal camera data including a plurality of intrinsic parameters as to a position and an orientation of the one or more internal cameras;
   generating, via a processor, an eye gaze vector for the driver based on the internal camera data, including the plurality of intrinsic parameters as to the position and the orientation of the one or more internal cameras;
   obtaining external data as to a region of interest outside the vehicle corresponding to the eye gaze vector of the driver, via one or more systems configured to generate the external data pertaining to an environment outside the vehicle including via use of an external camera of the vehicle, wherein the region of interest includes a point of interest offering a service for the driver;
   identifying the point of interest, via the processor, based on a statement made by the driver to an advisor in combination with the eye gaze vector and the external data; and
   providing feedback, via the processor, pertaining to the region of interest, including the point of interest offering the service for the driver, based on the internal camera data and the external data, including based on the eye gaze vector of the driver, the external camera of the vehicle, and the statement made by the driver to the advisor,
   wherein the statement made by the driver of the vehicle comprises a verbal statement made to a human advisor.

2. The method of claim 1, wherein the detection of external data as to the region of interest outside the vehicle is further enhanced via one or more satellite-based location systems in conjunction with map data.

3. The method of claim 1, further comprising:
   obtaining related information from a computer database pertaining to the point of interest;
   wherein the step of providing feedback comprises providing, via instructions provided by the processor to a display of the vehicle, the related information obtained from the computer database pertaining to the point of interest to the driver of vehicle.

4. The method of claim 3, wherein:
   the step of obtaining related information comprises obtaining advertising or promotional information pertaining to the point of interest obtained from the computer database; and
   the step of providing feedback comprises providing, via instructions provided by the processor to the display of the vehicle, the advertising or promotional information pertaining to the point of interest obtained from the computer database to the driver of vehicle.

5. The method of claim 3, wherein the step of providing feedback comprises providing, via instructions provided by the processor to a visual display screen or a visual projection system of the vehicle, the relevant information pertaining to the point of interest to the driver of vehicle.

6. A system comprising:
   an internal camera configured to obtain internal camera data pertaining a gaze of a driver inside a vehicle, the internal camera data including a plurality of intrinsic parameters as to a position and an orientation of the one or more internal cameras;
   a processor coupled to the internal camera and configured to at least facilitate generating an eye gaze vector for the driver based on the internal camera data, including the plurality of intrinsic parameters as to the position and the orientation of the one or more internal cameras; and
   one or more external systems configured to obtain external data as to a region of interest outside the vehicle corresponding to the eye gaze vector of the driver including via use of an external camera of the vehicle that is mounted outside the vehicle, wherein the region of interest includes a point of interest offering a service for the driver;
   wherein the processor is further coupled to the one or more external systems and is further configured to at least facilitate:
     identifying the point of interest based on a statement made by the driver to an advisor in combination with the eye gaze vector and the external data; and
     providing feedback pertaining to the region of interest, including the point of interest offering the service for the driver, based on the internal camera data and the external data, including based on the eye gaze vector of the driver, the external camera of the vehicle, and the statement made by the driver to the advisor;
   wherein the statement made by the driver of the vehicle comprises a verbal statement made to a human advisor.

7. The system of claim 6, wherein the one or more external systems further includes one or more satellite-based location systems, and wherein the external data as to the region of interest outside the vehicle is further enhanced via the one or more satellite-based location systems in conjunction with map data.

8. The system of claim 6, wherein the processor is further configured to at least facilitate:
   obtaining relevant information from a computer database pertaining to the point of interest; and
   providing instructions to a display of the vehicle to provide the relevant information obtained from the computer database pertaining to the point of interest to the driver of vehicle.

9. The system of claim 8, wherein the processor is configured to at least facilitate:

obtaining advertising or promotional information pertaining to the point of interest; and providing instructions to the display of the vehicle, the advertising or promotional information pertaining to the point of interest to the driver of vehicle.

10. The system of claim 8, wherein the processor is configured to at least facilitate providing instructions to a visual display screen of the vehicle, the relevant information pertaining to the point of interest to the driver of vehicle.

11. The system of claim 8, wherein the processor is configured to at least facilitate providing instructions to a visual projection system inside the vehicle, the relevant information pertaining to the point of interest to the driver of vehicle.

12. A vehicle comprising:
- an internal camera configured to obtain internal camera data pertaining a gaze of a driver inside a vehicle, the internal camera data including a plurality of intrinsic parameters as to a position and an orientation of the one or more internal cameras;
- a processor coupled to the internal camera and configured to at least facilitate generating an eye gaze vector for the driver based on the internal camera data, including the plurality of intrinsic parameters as to the position and the orientation of the one or more internal cameras;
- one or more external systems configured to obtain external data as to a region of interest outside the vehicle corresponding to the eye gaze vector of the driver including via use of an external camera of the vehicle that is mounted outside the vehicle, wherein the region of interest includes a point of interest offering a service for the driver; and
- a display system;
- wherein the processor is further coupled to the one or more external systems and is further configured to at least facilitate:
  - identifying the point of interest based on a statement made by the driver to an advisor in combination with the eye gaze vector and the external data; and
  - providing feedback pertaining to the region of interest, including the point of interest offering the service for the driver, based on the internal camera data and the external data, including based on the eye gaze vector of the driver, the external camera of the vehicle, and the statement made by the driver to the advisor;
  - wherein the statement made by the driver of the vehicle comprises a verbal statement made to a human advisor.

13. The vehicle of claim 12, wherein the one or more external systems further includes one or more satellite-based location systems, and wherein the external data as to the region of interest outside the vehicle is further enhanced via the one or more satellite-based location systems in conjunction with map data.

14. The vehicle of claim 12, wherein the processor is further configured to at least facilitate:
- obtaining relevant information from a computer database pertaining to the point of interest; and
- providing instructions to the display system to provide the relevant information obtained from the computer database pertaining to the point of interest to the driver.

15. The vehicle of claim 14, wherein the processor is configured to at least facilitate:
- obtaining advertising or promotional information pertaining to the point of interest; and
- providing instructions to the display of the vehicle, the advertising or promotional information pertaining to the point of interest to the driver of vehicle.

16. The vehicle of claim 12, wherein the display system comprises a visual display screen.

17. The vehicle of claim 12, wherein the display system comprises a visual projection system.

18. The method of claim 1, wherein the statement made by the driver to the human advisor comprises a verbal statement that the driver is hungry, and the point of interest comprises a restaurant.

* * * * *